INVENTOR
HENRY ROBERTS
BY
Dean Fairbank & Hirsch
ATTORNEYS

March 28, 1961

H. ROBERTS 2,977,085

AUTOMATICALLY CLOSING VALVES

Filed Jan. 13, 1958

INVENTOR
HENRY ROBERTS
BY
Dean, Fairbank & Hirsch
ATTORNEYS

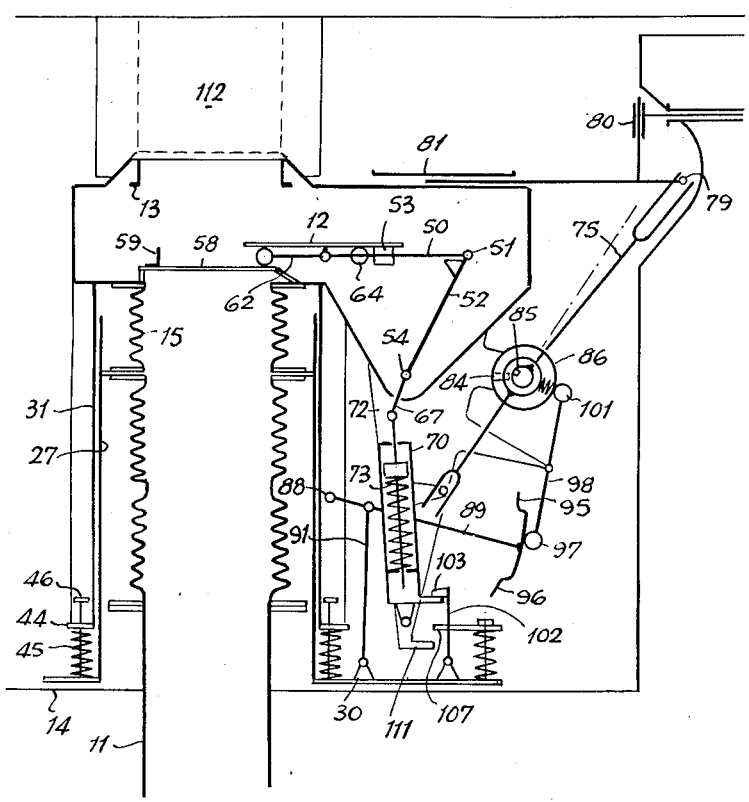

United States Patent Office 2,977,085
Patented Mar. 28, 1961

2,977,085
AUTOMATICALLY CLOSING VALVES

Henry Roberts, Winton, Bournemouth, England, assignor to Flight Refuelling Limited, Blandford, England, and A.E.I.-John Thompson Nuclear Energy Company Limited, London, England Filed Jan. 13, 1958, Ser. No. 708,693

Claims priority, application Great Britain Jan. 14, 1957

6 Claims. (Cl. 251—149)

This invention relates to an automatically closing valve for controlling an orifice and providing a completely unobstructed opening of the orifice when the valve is open. Such valves may be used, for example, to provide control of orifices through which fuel rods are inserted into and removed from atomic reactors, the valves preventing the escape to the surrounding atmosphere of a gaseous cooling medium such as carbon dioxide employed in the reactor.

The object of the invention is to provide a valve which will close automatically under certain conditions.

According to one aspect of the invention, an automatically closing valve comprises a head mounted on one end of an axially deformable tubular casing, a valve closure member adapted to close an orifice in said head and movable to a position at one side of said orifice to leave a clear passage through the casing, means applying an extending force to said tubular casing, and means responsive to extension of said tubular casing beyond a predetermined length to effect automatic movement of said valve closure member from its open to its closed position.

According to another aspect of the invention an automatically closing valve comprises a valve closure member co-operating with a seating surrounding an orifice at one end of an axially deformable tubular casing adapted to be axially contracted against the action of resilient means by bringing up thereto a second tubular casing making a fluid-tight joint therewith, the valve closure member being movable to a position at one side of the orifice to leave a clear passage through the two tubular casings, and means being provided which are operated by extension of said axially deformable tubular casing when the second tubular casing is withdrawn, to move the valve closure member to its closed position.

Preferably the axially deformable tubular casing is contractable without opening the valve, and the said valve can be opened and closed without change in the length of the said casing.

The invention is hereinafter described with reference to the accompanying drawings, in which:

Figures 4, 5 and 6 are diagrammatic sectional views of the coupling structure showing the valve and its operating mechanism in a number of different positions.

Figure 1:
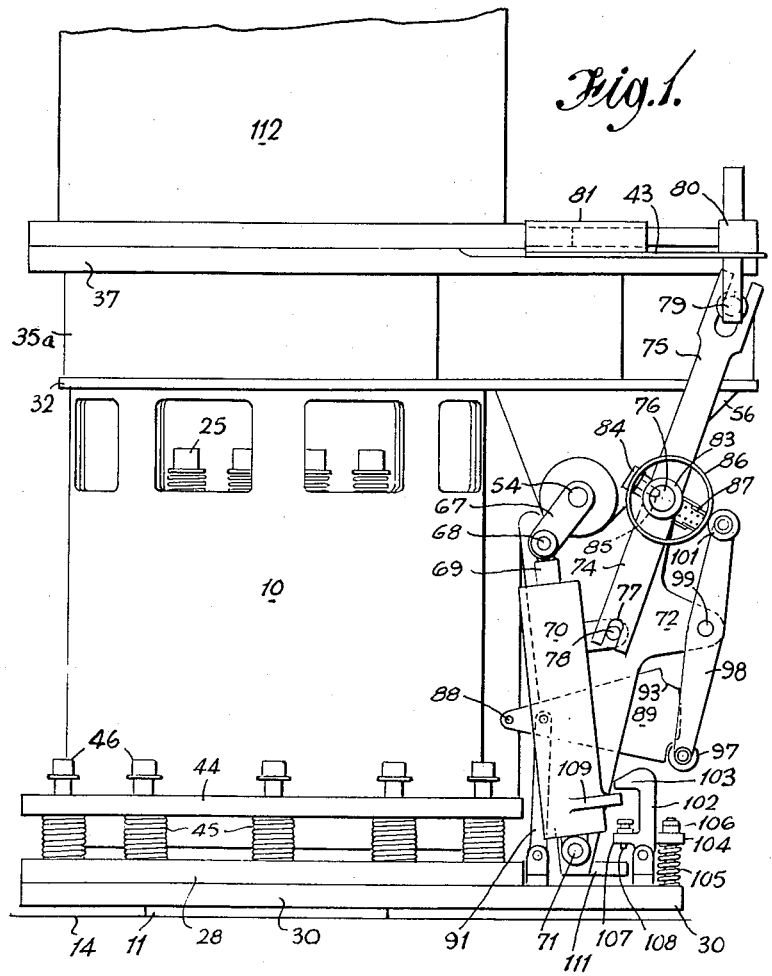
Figure 1 is a side elevation of a coupling structure incorporating a valve according to the invention.
Figure 2:
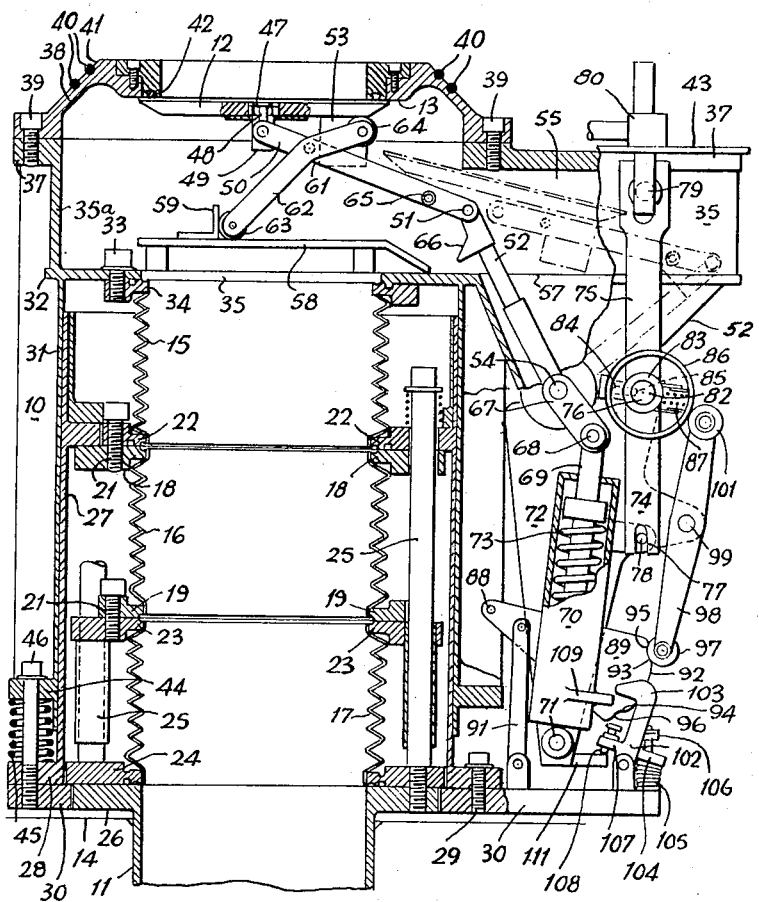
Figure 2 is an elevation similar to Figure 1, but partly in section, the valve being shown in the closed position.
Figure 3:
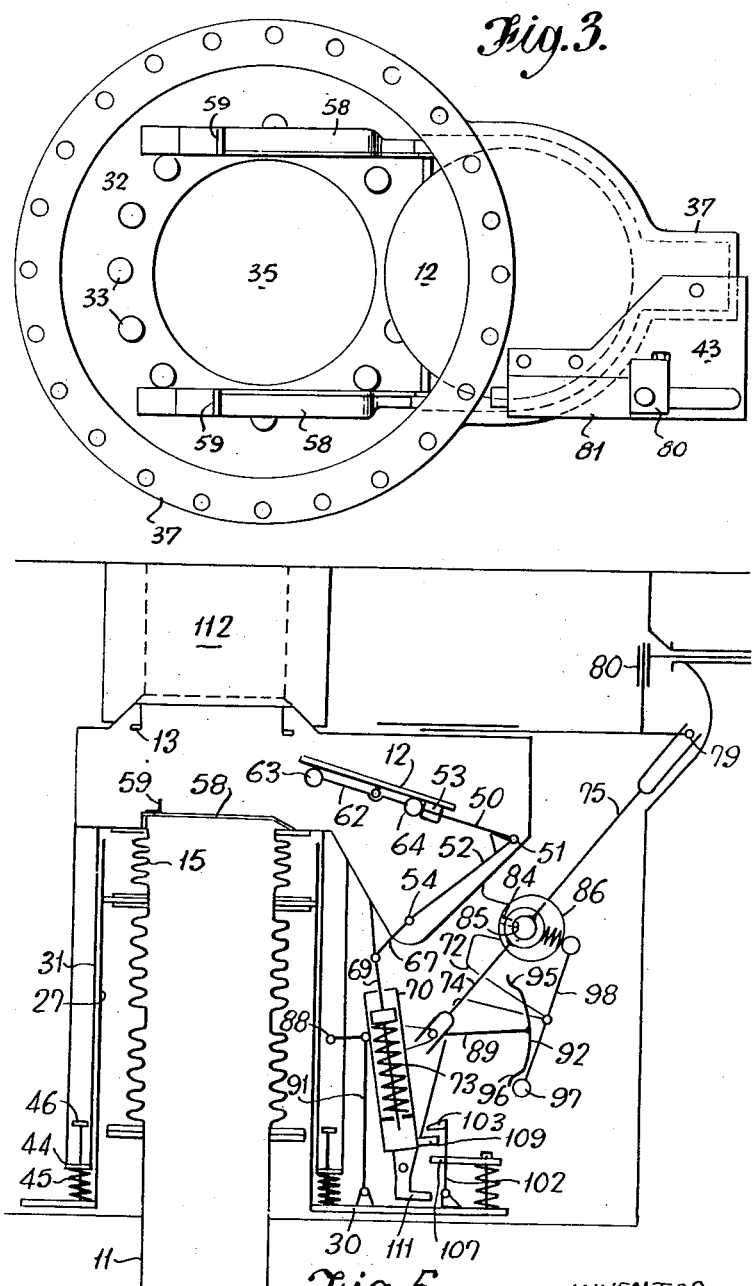
Figure 3 is a plan view of the structure shown in Figures 1 and 2 with parts broken away.

Referring to Figures 1 to 3 of the drawings, a coupling structure generally indicated by the reference numeral 10 is associated with a conduit 11 (Figure 2), in such a way that a valve closure member 12 in the coupling structure when seated on a seat 13 in the said structure, closes the conduit, and, when unseated, leaves a completely free and unobstructed passage through the conduit.

The conduit 11 may, for example, be a passage leading into an atomic reactor, through which fuel rods are inserted into or withdrawn from the reactor, the said conduit 11 extending through a thick concrete wall of the reactor, a fragment of which is shown at 14.

The coupling structure 10 comprises a plurality of co-axial tubes of bellows-like construction, three such tubes 15, 16 and 17 being shown in Figure 2. The tube 16 has its ends secured to stiff flanges 18 and 19 which are secured by bolts 21 to corresponding flanges 22, 23 on the adjacent ends of the tubes 15, 17, and the tube 17, at its other end, is secured to a flange 24, which is in turn secured, by the reduced and screw-threaded ends of a plurality of posts 25, to a flange 26 integral with the upper end of the conduit 11. The posts 25 form a circumferential array round the bellows tubes 15, 16, 17, and pass through holes in the flanges 18, 22, 23 so as to keep the said bellows tubes in alignment. The flange 22 extends radially outwardly beyond the flanges 18, 19 and 23, and has welded to its outer periphery a tubular shield 27 which extends upwardly towards the top of the bellows tube 15 and downwardly around the bellows tubes 16 and 17. On the lower end of the shield 27 there is an external flange 28 to the underside of which is secured, by bolts 29, a ring 30 the inner edge of which underlies the outer edge of the flange 24. Extension of the bellows tubes 16 and 17 is thus limited by the said shield 27. An outer shield 31, slidable on the shield 27, depends from a plate 32 secured by bolts 33 to a flange 34 carried by the upper end of the bellows tube 15, the plate 42 being of keyhole shape and having a circular aperture 35, concentric with its round end, coinciding with the passage through the bellows tubes 15, 16, 17. Spaced upwardly from the plate 32 by a peripheral wall 35a is a second plate 37 of the same shape as the plate 32, the plate 37 having an aperture larger than the aperture 35 and concentric therewith. The valve seat 13 is formed on the underside of a seat ring 38 secured by bolts 39 to the plate 37, the seat ring 38 presenting upwardly a frusto-conical surface 41, in which are formed grooves to receive two packing rings 40. The seat 13 is grooved at 42 to receive a packing ring against which the valve closure member is applied.

The outer shield 31 has an external collar 44 fixed to it adjacent its lower end, and coiled compression springs 45 disposed between the flange 28 and the collar 44 urge the outer shield 31, and consequently the plates 32 and 37, upwardly relative to the shield 27 and ring 30. The springs 45 are mounted around posts 46 having screw-threaded engagement at their lower ends with holes in the flange 28 and having heads at their upper ends which limit extension of the bellows tube 15 by engaging the upper side of the collar 44.

The valve closure member 12 comprises a disc mounted for a slight degree of universal tilting movement on a part-spherical bush 47 and having a weight 53 mounted thereon to cause it to tilt when moved away from the seat. The bush 47 is carried by a pin 48 which is in turn carried by a shaft 49 extending between two spaced arms 50 the opposite ends of which are connected by a further shaft 51 forming a pivotal connection between the arms 50 and a lever 52 fixed to a shaft 54 extending across a downward extension of the cavity 55 formed between the plates 32 and 37. The downward extension of the cavity is formed by a metal housing 56 welded at its edges to the edges of a hole 57 in the parallel-sided portion of the plate 32. A pair of parallel guide rails 58, Figure 3, are provided one on each side of the aperture 35, on the plate 32, stops 59 being provided on the said rails. To the arms 50, at 61, are pivoted a pair of cranked strips, one of which is shown at 62, the pivots 61 being at the elbows of the said strips, and at each end of the said strips is mounted a shaft carrying a pair of rollers adapted to engage the guide rails 58. One roller at one end of the strips is shown at 63, and one roller at the other end of the said strips at 64.

The valve closure member 12 is shown in Figure 2 in its seated position, the arm 52 being at one end of its angular movement about the shaft 54. The rollers 63 are in engagement with the stops 59, having engaged the said stops as the arm 52 moved towards the position in which it is shown, so that the final movement of the arm 52 causes the pivot point 61 to move upwardly and the arms 50 to press the valve closure member upwardly towards its seat. When the arm 52 is moved in the opposite direction, the pivot point 61 moves downwardly until the rollers 64 engage the tracks 58, and the valve closure member 12 which is caused by the weight 53 to tend to align itself with the arm 50 is then moved bodily to the right into the space between the parallel-sided parts of the plates 32 and 37, the rollers riding off the rails 58 and the valve closure member being supported by engagement of a rod 65 extending between the two arms 50 with a projection 66 on the arm 52.

The shaft 54 which carries the arm 52 has fixed to it, outside the housing 56, another arm 67 (Figures 1 and 2) pivotally attached at 68 to the upper end of a stem 69 slidably mounted in a spring box 70 pivotally mounted at 71 on a bracket 72 depending from the housing 56. The spring 73 in the spring box acts upwardly on the stem 69 and the stem 69 and spring box 70 together constitute a resilient link of a toggle, of which the other link is the arm 67, the spring 73 always tending to reduce the angle between the links and so to fold the toggle in one direction or the other depending on which side of a straight line joining the axes of the shaft 54 and the mounting 71 the elbow of the toggle lies. Also pivotally mounted on the bracket 72 are two arms 74, 75 forming together a two-part lever turning about an axis at 76, the arm 74 being formed with a forked end 77 in which is engaged a pin 78 mounted on a lug on the spring 70, the other arm 75 also having a forked end engaging a pin 79 on a slide member 80 guided in a tubular guide 81 on a plate 43 bolted to the plate 37 for movement in the plane of the said plate. The arm 75 is fixed to a shaft 82 which rotates in a suitable bearing in the bracket 72, the arm 74 being formed with a hollow boss 83 which fits over the shaft 82, and a pin 84 passes radially through the boss 83 into a socket 85 in the shaft 82 to maintain the arms 74, 75 in alignment. The pin is mounted in a ring 86, as shown in Figure 1, a spring 87, acting between the opposite side of the boss and the said ring, urging the pin 84 into engagement with the socket 85.

Pivotally mounted at 88 on the outer shield 31 is a cam arm 89, the said cam arm being coupled by a pivoted link 91 to the ring 30 so that upward movement of the shield 31 relative to the shield 27 rocks the cam arm 89 downwardly. The cam edge on the cam arm 89 comprises a raised central portion 92 connected by ramps 93, 94 to lower end portions 95, 96, and a follower roller 97 mounted on one arm of a rocking lever 98 pivoted at 99 on the bracket 72 engages the cam edge. The other end of the rocking lever 98 carries a roller 101 which engages the ring 86 and, when the roller 97 rides up a ramp on to the central portion 92 of the cam edge, moves the ring to disengage the pin 84 from the socket 85.

Mounted on the ring 26 is a trip member 102 comprising a pivoted hook 103 urged to the position shown in Figure 1 by a coiled compression spring 105 acting between a lug 104 on the trip member and the upper surface of the ring 26. A bolt 106 acts to limit extension of the spring 105 and so prevent the trip member from moving in an anti-clockwise direction beyond the position shown in Figure 1. Another lug 107 on the trip member projects in the same direction as the hook 103, an adjustable abutment screw 108 being mounted in the lug 107. A lateral projection 109 is provided on the spring box 70 which cooperates with the hook 103 as will be hereinafter described, the bracket 72 also having at its lower end a lateral projection 111 cooperating with the lug 107.

A gas-tight dome or cover member 112 is shown in Figures 1, 4, 5 and 6, this member 112 being brought down into engagement with the seat ring 38 so as to make a substantially fluid-tight joint therewith when it is required to insert or remove fuel rods, and being equipped internally with a hoist or the like so that the manipulation of the fuel rods can be effected without opening the interior of the reactor to the atmosphere. The valve closure member 12 is normally kept in the seated position when the member 112 is not in position to cover the opening. The weight of the member 112, when it is lowered on to the top of the coupling structure, compresses the bellows tube 15 so that the outer shield 31 moves from the position shown in Figures 2 and 4 to the position shown in Figures 1 and 5, compressing the springs 45 and causing the bracket 72 to move downwardly relative to the ring 30.

Figure 4:
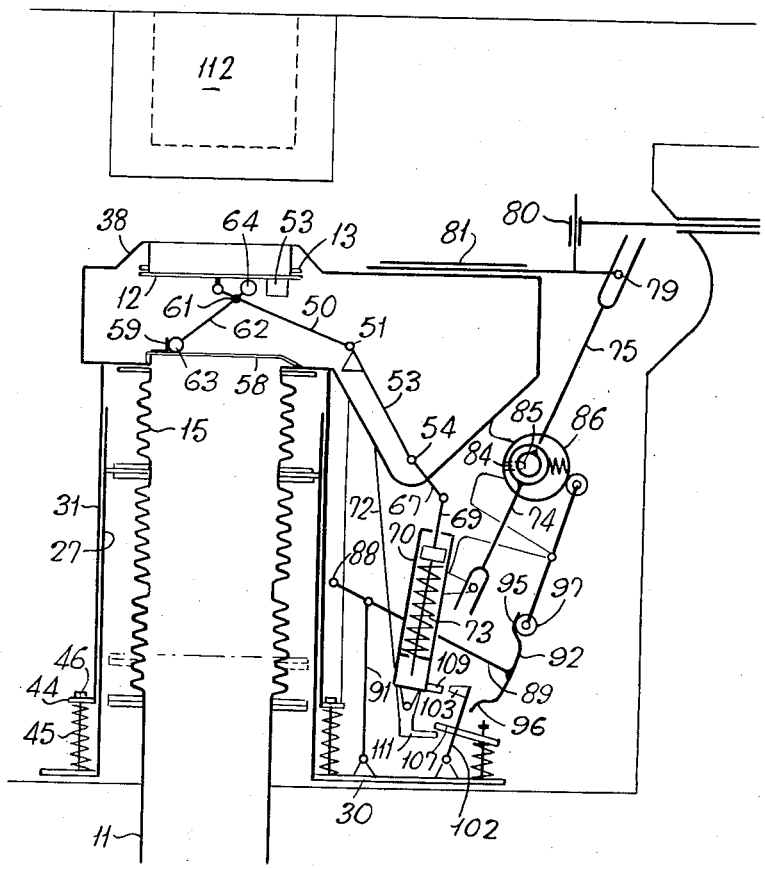

The valve closure member can be moved at will from the closed position of Figure 4 to the open position of Figure 5, and vice versa, by manipulation of the slide member 80, regardless of whether the shield 31 is in its upper or lower position, but if, whilst the shield is in its lower position and the valve closure member is unseated, as shown in Figure 5, the member 112 is lifted away from the coupling structure, the projection 109 is engaged by the hook 103 as the shield 31 rises, and the spring box 70 is rocked past its dead-centre position, causing the valve closure member to seat.

The operation of the device will now be more fully described with reference to Figures 4, 5 and 6 of the drawings, Figure 4 showing the parts in the positions which they occupy when the coupling structure is extended and the valve closed, Figure 5 showing the parts in the positions which they occupy when the coupling structure is compressed and the valve is open, and Figure 6 showing the parts in a position such that the valve has just commenced to close automatically.

Referring to Figure 4, it will be seen that the bellows tube 15 is extended to the limit permitted by engagement of the collar 44 with the heads on the posts 46, with the result that the bracket 72 is in its upper position, the hook 103 of the trip member 102 is rocked backwardly against the spring 105 by the projection 111, and the cam arm 89 is pulled downwardly by the link 91 until the follower roller 97 engages the upper end portion 95 of the cam. The pin 84 is thus able to engage in the socket 85 and hold the two arms 74, 75 in alignment so that they are able to act as a single lever. It will be apparent that movement applied to the arm 75 by the slide member 80 will open the valve, and that it can be re-closed by opposite movement of the said slide member.

If, now, the member 112 is lowered to engage the valve seat ring 38, its weight compresses the bellows tube 15, and causes the outer shield 31 to move downwardly against the springs 45. The bracket 72 moves downwardly, causing the projection 111 to move away from the lug 107 and the projection 109 to move to a position below the hook 103, the hook lying in the path of the said projection. The cam arm 89 is rocked upwardly, causing the follower roller 97 to move over the raised portion 92 of the said cam on to the lower end portion 96. The valve can be opened by manipulation of the slide rod 80, and, when it is opened, the parts are in the positions shown in Figure 5. The valve can be reclosed manually when it is desired to remove the member 112.

If, however, the member 112 is lifted without the slide member 80 first being operated to close the valve, the shield 31, being relieved of the weight of the said member, move upwardly, causing downward movement of the cam arm 89, and upward movement of the projection 109 relative to the hook 103 of the trip member. The follower roller 93 moves on to the raised central portion 92 of the cam, the rocking lever 98 moving the ring 86 to release the pin 84 from the socket 85, and, the upward movement of the projection 109 being checked by the hook 103, the spring box is rocked over past its dead-centre position, so that the spring 73 closes the valve. Immediate automatic closing therefore takes place, and no substantial leakage of gas from the interior of the reactor can take place.

The arms 74, 75 are re-locked together by returning the slide member 80 to the "valve-closed" position, which allows the pin 84 to drop into the socket 85.

The invention is not limited to the particular construction described, but includes other valve arrangements in which a valve closure member is caused to close automatically by the extension of a longitudinally deformable tube the passage through which is sealed by the seating of said valve closure member. For example, the valve closure member may be mounted on a hinged arm so as to swing in an arcuate path between its open and closed positions, being normally held in the open position by latch means which resist the closing force exerted by a spring and are released by extension of the tube.

I claim:

1. An automatically closing valve comprising a tubular casing axially deformable between an extended and retracted position, a head mounted on one end of said casing, said head having an orifice, a valve closure member adapted to close said orifice in said head and movable to a position at one side of said orifice to leave a clear passage through said casing, means to apply an extending force to said tubular casing to move it to said extended position, means responsive to extension of said tubular casing beyond a predetermined length to effect automatic movement of said valve closure member from its open to its closed position, and means when said tubular casing is in retracted position manually to effect opening and closing of said valve member.

2. An automatically closing valve comprising a tubular casing axially deformable between an extended and retracted position, resilient means normally urging said casing to extended position, said casing having an orifice at one end with an encompassing valve seat, a second tubular casing movable against said end of said first tubular casing to effect a fluid tight seal therebetween, said first tubular casing being moved to said retracted position against the tension of said resilient means when said second casing is moved thereagainst, a valve closure member adapted to move against said seat to close said orifice and movable to a position at one side of said orifice to leave a clear passageway through the two tubular casings, means controlled by the movement of said first casing to extended position when said second casing is moved away therefrom to effect movement of said valve member to closed position and means when said first tubular casing is in retracted position manually to effect opening and closing of said valve member.

3. The combination set forth in claim 2 in which a toggle linkage is provided comprising an extensible member, resilient means normally urging said member to extended position, a lever pivoted between its ends, a link pivotally connected at one end to one end of the lever and at its other end to the extensible member and a linkage between the other end of said lever and said valve closure member, the end of the extensible member pivotally connected to the lever being movable from one side of the pivot of the lever to the other to effect opening and closing of said valve member.

4. The combination set forth in claim 3 in which the manually operable means comprising a divided lever, having two pivotally connected parts, pivotally mounted between its ends, means releasably to lock the parts of the lever together, one end of said lever being pivotally connected to said toggle linkage to effect movement of the end of the extensible member pivotally connected to said first named lever from one side of the pivot of said lever to the other.

5. The combination set forth in claim 4 in which trip means are provided, and means controlled by movement of said first tubular casing to extended position and engaging said trip means, to effect movement of the end of said extensible member pivotally connected to said first lever to position to effect closing of said valve member, and means controlled by the extension of said first tubular casing to release the locking means for said divided lever.

6. The combination set forth in claim 5 in which said last named means comprises a cam arm pivotally mounted between its ends, means pivotally connecting one end of said cam arm to said first tubular casing, whereby movement of said tubular casing will rotate the cam arm about its pivot, the free end of said cam arm having a cam edge, a lever pivotally mounted between its ends having a follower at one end engaging said cam edge, a movable ring member adjacent the pivot of said divided lever, said ring member carrying a pin adapted to lock said two parts of the divided lever together, the free end of said lever being movable against said ring member to move the latter and the pin carried thereby.

References Cited in the file of this patent

UNITED STATES PATENTS 2,300,483  Berger _____ Nov. 3, 1942